United States Patent
Schmitz et al.

(10) Patent No.: US 10,710,191 B2
(45) Date of Patent: Jul. 14, 2020

(54) RETRACTABLE WORK CABLE

(71) Applicant: ILLINOIS TOOL WORKS INC., Glenview, IL (US)

(72) Inventors: Adam Richard Schmitz, Appleton, WI (US); Chris J. Roehl, Appleton, WI (US); Scott Ryan Rozmarynowski, Greenville, WI (US); Zachary William MacMullen, Larsen, WI (US); Lauren Goulet, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 549 days.

(21) Appl. No.: 15/476,178

(22) Filed: Mar. 31, 2017

(65) Prior Publication Data

US 2018/0281098 A1 Oct. 4, 2018

(51) Int. Cl.
| | | |
|---|---|---|
| *B23K 9/32* | (2006.01) | |
| *B23K 9/10* | (2006.01) | |
| *B65H 75/48* | (2006.01) | |
| *H01R 39/12* | (2006.01) | |
| *B65H 75/44* | (2006.01) | |
| *B65H 75/42* | (2006.01) | |

(52) U.S. Cl.
CPC ............ *B23K 9/327* (2013.01); *B23K 9/1006* (2013.01); *B23K 9/32* (2013.01); *B65H 75/42* (2013.01); *B65H 75/4418* (2013.01); *B65H 75/4486* (2013.01); *B65H 2701/34* (2013.01)

(58) Field of Classification Search
USPC ................... 310/156.66, 156.67, 156.69, 263
See application file for complete search history.

(56) References Cited

U.S. PATENT DOCUMENTS

| | | | | | |
|---|---|---|---|---|---|
| 3,835,626 | A | * | 9/1974 | Miyake | A47L 5/362 |
| | | | | | 55/319 |
| 4,249,062 | A | * | 2/1981 | Hozumi | B23K 9/12 |
| | | | | | 219/124.22 |
| 4,780,594 | A | * | 10/1988 | Rothermel | B23K 9/124 |
| | | | | | 219/136 |

(Continued)

FOREIGN PATENT DOCUMENTS

WO   2008106419   9/2008

OTHER PUBLICATIONS

Trans-Motion Industries Inc., Catalog Product Sheet, p. 3, Reels: Welding Cable, Power Cord and Hose, Pricing Effective: Jan. 1, 2011, 1 page.

*Primary Examiner* — Ibrahime A Abraham
*Assistant Examiner* — Gyounghyun Bae
(74) *Attorney, Agent, or Firm* — McAndrews, Held & Malloy, Ltd.

(57) ABSTRACT

Apparatus and methods are disclosed of a welding-type system includes a welding-type power supply configured to provide welding-type power. A reel located within a housing of the welding-type power supply. A welding-type cable, the reel configured to wind the welding-type cable to reduce a length of the welding-type cable extending from the housing, and to unwind to increase a length of the welding-type cable extending from the housing at least partially wound around the reel when stored. The welding-type cable includes a first end secured to the reel and electrically connected to the welding-type power supply and a second end configured to provide the welding-type power to at least one welding-type tool.

14 Claims, 4 Drawing Sheets

(56) References Cited

U.S. PATENT DOCUMENTS

| | | | | |
|---|---|---|---|---|
| 5,101,082 A * | 3/1992 | Simmons | ............... | H02G 11/02 |
| | | | | 191/12.2 R |
| 5,502,358 A * | 3/1996 | Lee | ............ | A47L 9/26 |
| | | | | 318/6 |
| 5,553,347 A * | 9/1996 | Inoue | ......... | A47L 5/28 |
| | | | | 15/327.3 |
| 6,601,979 B1 * | 8/2003 | Byrd | ....................... | B60Q 1/326 |
| | | | | 362/193 |
| 6,725,986 B2 * | 4/2004 | Reindle | .................. | B65H 75/42 |
| | | | | 191/12.2 A |
| 7,294,808 B2 * | 11/2007 | Furman | .................. | B23K 9/095 |
| | | | | 219/132 |
| 7,390,989 B2 | 6/2008 | Matiash et al. | | |
| 7,884,304 B2 | 2/2011 | Brietbach | | |
| 7,967,120 B2 * | 6/2011 | Popesco | ..................... | B63J 3/04 |
| | | | | 191/12.2 R |
| 8,278,600 B2 * | 10/2012 | Justice | ..................... | B23K 9/10 |
| | | | | 219/137.2 |
| 8,348,034 B2 * | 1/2013 | Fila | ......................... | A61B 18/08 |
| | | | | 191/12.2 R |
| 8,757,339 B2 * | 6/2014 | Harty | ................. | B65H 75/4423 |
| | | | | 191/12 R |
| 2011/0241471 A1 * | 10/2011 | Tokizawa | ............... | H02K 1/243 |
| | | | | 310/185 |
| 2012/0303175 A1 * | 11/2012 | Lambert | .............. | B23K 9/0953 |
| | | | | 700/298 |
| 2014/0151351 A1 * | 6/2014 | Granato, Jr. | ........... | B23K 9/173 |
| | | | | 219/137.71 |
| 2014/0374394 A1 * | 12/2014 | Sigl | ..................... | H01L 23/4093 |
| | | | | 219/130.1 |

* cited by examiner

RETRACTABLE WORK CABLE

BACKGROUND

Industries that require on-site welding (e.g., the pipeline and construction industries) employ welding power sources permanently mounted to a vehicle. For instance, the vehicle is driven to the work site, a length of welding-type cable is connected on one end to equipment mounted on the vehicle (e.g., a welding-type power supply), with a second end connected to a welding-type tool. The tool is then brought to the work area. Storage of long welding-type cables may be implemented by rolling, winding, folding, or other means of transporting and attaching the cable to the vehicle (e.g., wrapping the work cable around the power supply, the shielding gas cylinder, etc.). Often, the cable is exposed to the environment (e.g., a work site, a shipyard, an industrial setting, etc.), which can cause damage to the cable. The cable may also be folded or coiled in a manner which causes kinks, which may lead to damage to the cable, especially in a multi-function welding-type cable.

SUMMARY

Apparatuses and methods are disclosed of a welding-type system that includes a reel configured to wind the welding-type cable to reduce a length of the welding-type cable extending from the system, and to unwind to increase a length of the welding-type cable extending from the system at least partially wound around the reel when stored, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
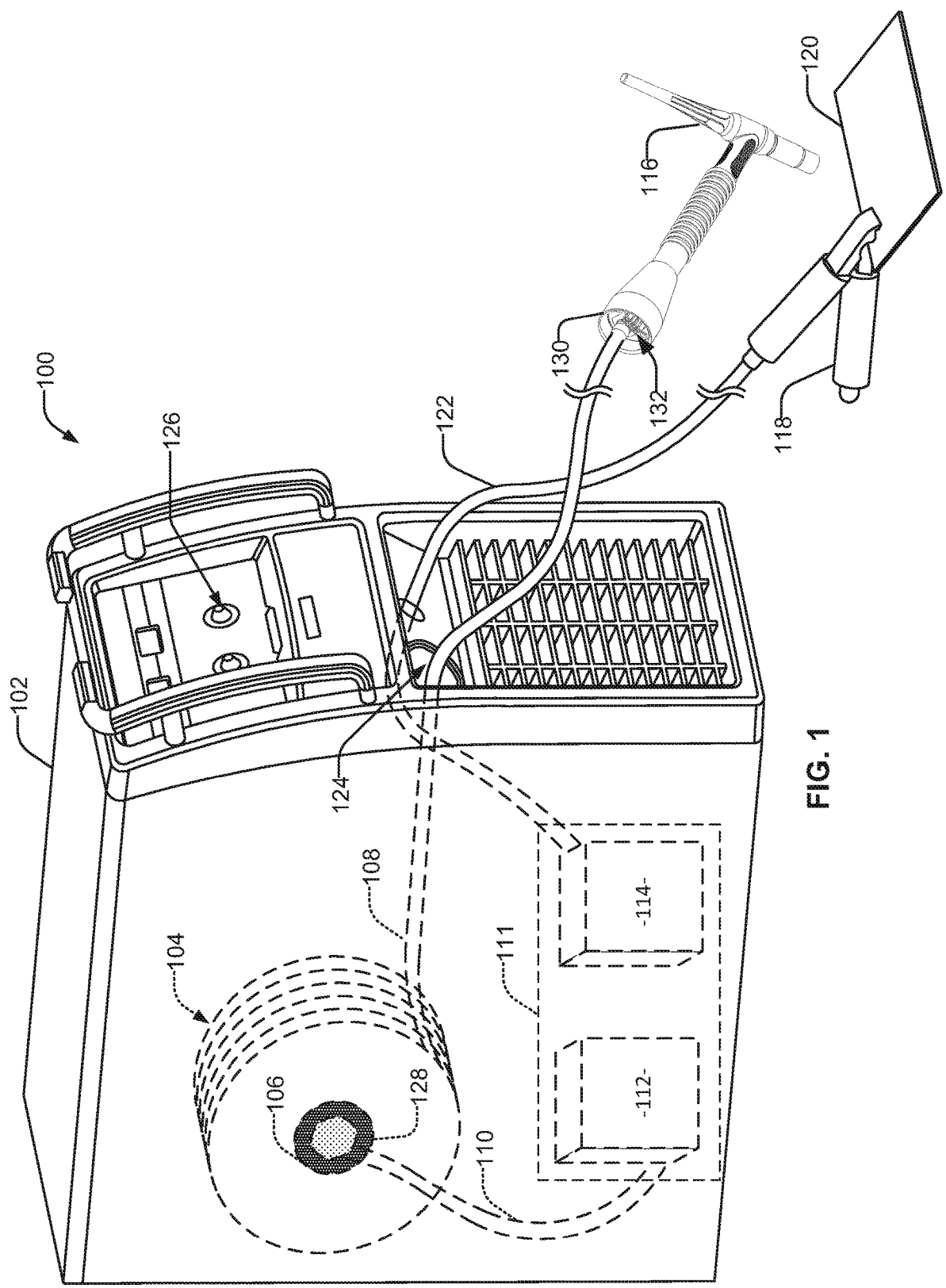
FIG. 1 illustrates an example welding-type power supply with a retractable reel in accordance with aspects of this disclosure.

In examples disclosed herein, a welding-type system includes a cord management system, such as a reel, configured to wind the welding-type cable to reduce a length of the welding-type cable extending from the system, and to unwind to increase a length of the welding-type cable extending from the system at least partially wound around the reel when stored. In an example, a reel is mounted directly inside a welding-type power supply. The reel is integrated with the power supply allowing the welding-type cable to be neatly wound around the reel in an enclosed housing when the welding-type cable is not in use.

In some examples, the reel is spring driven, which will allow for the reel to automatically rewind. The reel features a locking ratchet that allows for a certain amount of the cable to be pulled from the system without the cable being pulled back onto the reel. The cable reel provides a current path through a conductor (e.g., a slip ring) that allows the current to travel from the welding-type power supply to a welding-type tool (e.g., a welding torch).

The reel can be integrated into a portable welding-type system, such as in a welding-type power supply, a welding-type cart, a rack system, or other suitable structure. Advantageously, the cord management system described herein provides a portable, integrated solution, which prevents unnecessary cable extension. For instance, in a welding-type environment, dust, water, fluctuations in temperature, and other potential sources of damage to equipment are ever-present. Advantageously, the reel system protects cables from the environment when not in use and reduces clutter in the workspace. As a result, the cable is less exposed to hazards, from machinery, traffic, environmental contaminants, etc.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" (e.g., controller, control circuit, etc.) includes any analog and/or digital components, power and/or control elements, such as a microprocessor, digital signal processor (DSP), software, and the like, discrete and/or integrated components, or portions and/or combinations thereof.

In an example, a welding-type system includes a welding-type power supply configured to provide welding-type power. A reel located within a housing of the welding-type power supply. A welding-type cable, the reel configured to wind the welding-type cable to reduce a length of the welding-type cable extending from the housing, and to unwind to increase a length of the welding-type cable extending from the housing at least partially wound around the reel when stored. The welding-type cable includes a first end secured to the reel and electrically connected to the welding-type power supply and a second end configured to provide the welding-type power to at least one welding-type tool.

In an example, the reel further includes an electrical connector electrically connecting the first end of the welding-type cable to the welding-type power supply, the electrical connector including a first conductor ring connected to the first end of the welding-type cable and a second conductor ring connected to the welding-type power supply, the first conductor ring being concentric with the second conductor ring.

In disclosed examples, the first and second concentric conductor rings are rotationally aligned such that, during rotation of the reel, electric power is provided to the welding-type cable from the welding-type power supply via the first and second conductor rings. In some examples, each of the first and second conductor rings includes a layer of conductive material at an interface between the first and second conductor rings. In examples, the first and second conductor rings are substantially circular in shape, and are positioned within a circular shaped cavity extending into one side of the reel.

In an example, a spring is included to provide tension for retracting the welding-type cable by winding the reel when the welding-type cable is at least partially removed from the housing. In some examples, the reel further includes a locking ratchet to allow the welding-type cable to extend from the opening and prevent automatic retraction of the welding-type cable into the housing. In examples, the locking ratchet further configured to allow retraction of the welding-type cable into the housing upon release of the locking ratchet. In an example, a second end of the welding-type cable includes an extension connector configured to prevent the second end of the welding-type cable from retracting into the housing. In some examples, the extension connector is part of the first electrical connector and is configured to both electrically and mechanically connect the welding-type tool to the welding-type cable.

In examples, the welding-type tool is one of a welding-type torch, a plasma cutter, an induction heating cable, or a work clamp. In an example, the reel is fixed to an interior surface of the housing.

In an example, the reel includes a cover to protect the welding-type cable during winding and unwinding of the welding-type cable on and off of the reel. In some examples, the reel cover includes a cavity housing the welding-type cable and the spring.

In an example method of storing a welding-type cable is disclosed, including connecting a first end of a welding-type cable to an electrical connector, removing a portion of the welding-type cable from a reel that is stored within a housing, the portion including a second end of the welding-type cable configured to connect to a welding-type tool, locking, by a ratchet lock, the portion of the welding-type cable that is removed from the housing. The method also includes releasing, at the ratchet lock, the portion of the welding-type cable, and automatically retracting the portion of the welding-type cable around the reel in response to the releasing.

In some examples, the method includes connecting a second end of the welding-type cable to a welding-type tool. In an example, the electrical connector includes a first conductor ring connected to the first end of the welding-type cable and a second conductor ring connected to the welding-type power supply, the first conductor ring being concentric with the second conductor ring. In some examples, the retracting is initiated by a spring to provide tension for winding the welding-type cable around the reel when the welding-type cable is at least partially removed from the housing.

In examples, the first and second conductor rings are rotationally aligned such that electric power is provided to the welding-type cable from the at least one power source during rotation of the reel.

FIG. 1 is an example welding-type system 100 including a welding-type power supply 102 enclosed in a housing which incorporates a retractable cable reel 104. The reel 104 can include a retractor 106, providing a mechanism for the reel to wind and unwind a cable 108. The cable 108 can extend from an opening 124 of the housing, and connect with a welding-type tool 116 (e.g., a welding-type torch, a plasma cutter, induction heating device, work clamp, etc.). The reel 104 is connected to a power input 112 within a power system 111 of the welding-type power supply via an input cable 110. The input cable 110 connects to the reel 104 through an electrical connector 128. The electrical connector 128 can include a slip-ring, constructed from concentric rings configured to transfer electric power as the reel 106 rotates. For instance, two or more substantially circular conductor rings can define the slip-ring, positioned within a circular cavity extending through a center of the reel 106. Additionally or alternatively, the electrical connector 128 can include a brush contact, or other conductive member that allows current to flow during rotation of the reel 106.

The retractable cable 108 is wound around the reel 104 and stored until used. The retractable cable 108 is repeatedly extended and retracted through an opening 124 during and after each use. The reel 104 includes a spring to provide the force needed to rotate the reel 104 and thereby retract the cable 108 back into the housing 102. The addition of multiple or stronger springs can increase the tension for certain applications that use large or heavy cables. In some examples, the spring can be made of spiral spring made of a resilient material, such as steel. An extension connector 130 can be attached to an end of the cable 108 to prevent the entirety of the cable 108 from retracting into the housing, as well as provide for a first electrical connector 132 for connectivity to a variety of welding-type tools 116 (e.g., a TIG-type torch).

Thus, the controller regulates a speed and/or length of cable that is extended and/or retracted, according to a user input and/or input from one or more sensors (e.g., a length measuring device, an on/off trigger from the welding-type power supply, etc.).

In some examples, the retractable cable reel 104 includes a spring to automatically rewind an extended portion of the cable 108. The reel 104 can be mounted within the housing of the welding-type power supply 102, and be configured to rotate as the cable 108 is wound and unwound. For example, the cable 108 can be partially stored on the reel 104 and pass through the opening 124. The cable 108 can be withdrawn from the housing by pulling on the cable 108.

In an example, the retractor 106 features a locking ratchet that allows for a certain amount of the cable to be pulled from the system without the cable being pulled back onto the reel. The locking ratchet further allows retraction of the cable 108 into the housing upon release of the locking ratchet. In some examples, actuating the motorized retractor 106 can cause the reel 104 to unwind, allowing the cable 108 to extend from the housing 102. In an example, the retractor 106 includes a manual device which can be used to wind and unwind the cable 108. The manual device can be a crank or other type of turn, which may not automatically rewind the cable 108. In a situation where an override function is needed, the manual device can allow for extraction and/or retraction of the cable 108 when, for example, no power is available for a motorized retractor.

Thus, the disclosed reel 104 provides a retractable cord system that is durable and can withstand high operational use, such as repeated winding and unwinding of the welding-type cable 108. The reel 104 can be compact, integrated with other welding-type systems (e.g., a welding-type power supply) which reduces clutter and the need for multiple devices.

As such, the cable 108 should be constructed to withstand the amount of force needed to withdraw the cable 108 from the housing of the welding-type power supply 102 without damaging or breaking the cable 108.

In an example, a spring tension is applied on the retractable cable. The level of tension can be adjusted for a particular application (e.g., for a wire with a specific length, weight, number of conductors/tubes, etc.). In some examples, the construction of the connector 128 can be customized to provide for power, gas, wire, and/or other welding-type inputs and consumables (e.g., for FCAW welding, a cable with an integrated gas line, etc.). In other examples, the retractable cable management system can be used for a variety of cables/tubing/cords, etc. For example, a cable that includes tubing, may need to be wound in a large loop to avoid damage to the wire, such as kinks, during winding and unwinding. In some examples, the retractable system can be used to wind and unwind a gas line, a ground cable, or other types of welding-type cables.

Operation of the power supply 102 can be governed by use of one or more interfaces 126. The interface 126 can provide commands, display and communication with one or more devices. In some examples, the interface 126 can adjust and/or monitor operational settings by a modified and/or configurable user interface. In an example, a button can be used to select a welding operation, which can then be adjusted (e.g., with a dial, a touch panel, membrane switch, etc.).

As illustrated in FIG. 1, the interface 126 may be on a control panel integrated with the housing 102. The interface 126 can include one or more switches and/or buttons, each having a singular and/or multi-purpose function. In some examples, the interface 126 can operate a motor powering the retractor 106. For instance, a user can initiate an automatic rewinding of the cable 108 onto the reel 104 by activating the motorized retractor 106. A motor control can be configured to adjust the speed and/or torque applied to the reel 104 as the cable 108 is retracted. In an example, the interface 126 can communicate with a remote interface.

The system 100 further includes a welding-power return unit 114, connecting to a work clamp 118 via work cable 122. The work clamp 118 connects to a work piece 120 during a welding operation. In some examples, each of the welding-type cable 108 and the work cable 122 can be stored on separate retractable reels within the power supply 102. Additionally or alternatively, each cable can be further connected to another retractable reel (not shown) to extend the reach and capability of the retractable cable system. Moreover, an integrated and/or external retractable reel may provide power and/or control signals to accessories to the welding-type system 100 (e.g., a wire feeder, a heating unit, etc.).

Figure 2:
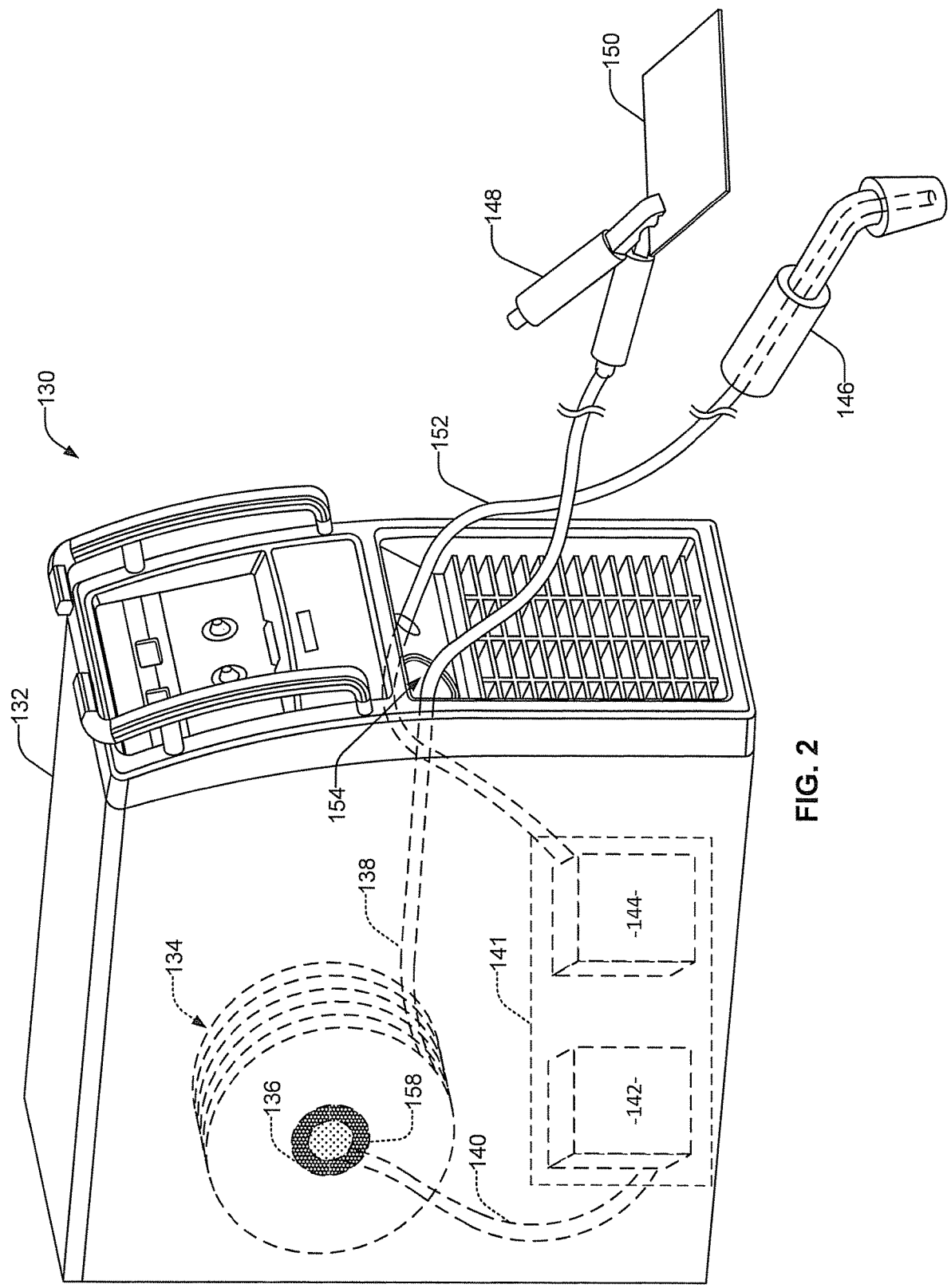
FIG. 2 is welding-type system with a retractable reel in accordance with aspects of this disclosure.

FIG. 2 illustrates another example welding-type system 130 that includes a welding-type power supply 132 enclosed in a housing which incorporates a retractable cable reel 134. Similarly to FIG. 1, the reel 134 can include a retractor 136, providing a mechanism for the reel to wind and unwind a welding-type cable, for example a work cable 138. The work cable 138 can extend from an opening 154 of the housing 132, and connect with a work clamp 148 which, when connected to a workpiece 150, provides a return to a welding-power return unit 142 within a power system 141. The reel 134 connects the work clamp 148 to the welding-power return unit 142 via a return cable 140 and an electrical connector 158. The electrical connector 158 is configured to operate in a manner similar to the electrical connector 128, as described with respect to FIG. 1. In the example of FIG. 2, a welding-type tool 146 (e.g., a MIG-type torch) is connected to a power output 144 via a welding-type cable 152 to provide welding-type power.

Figure 3:
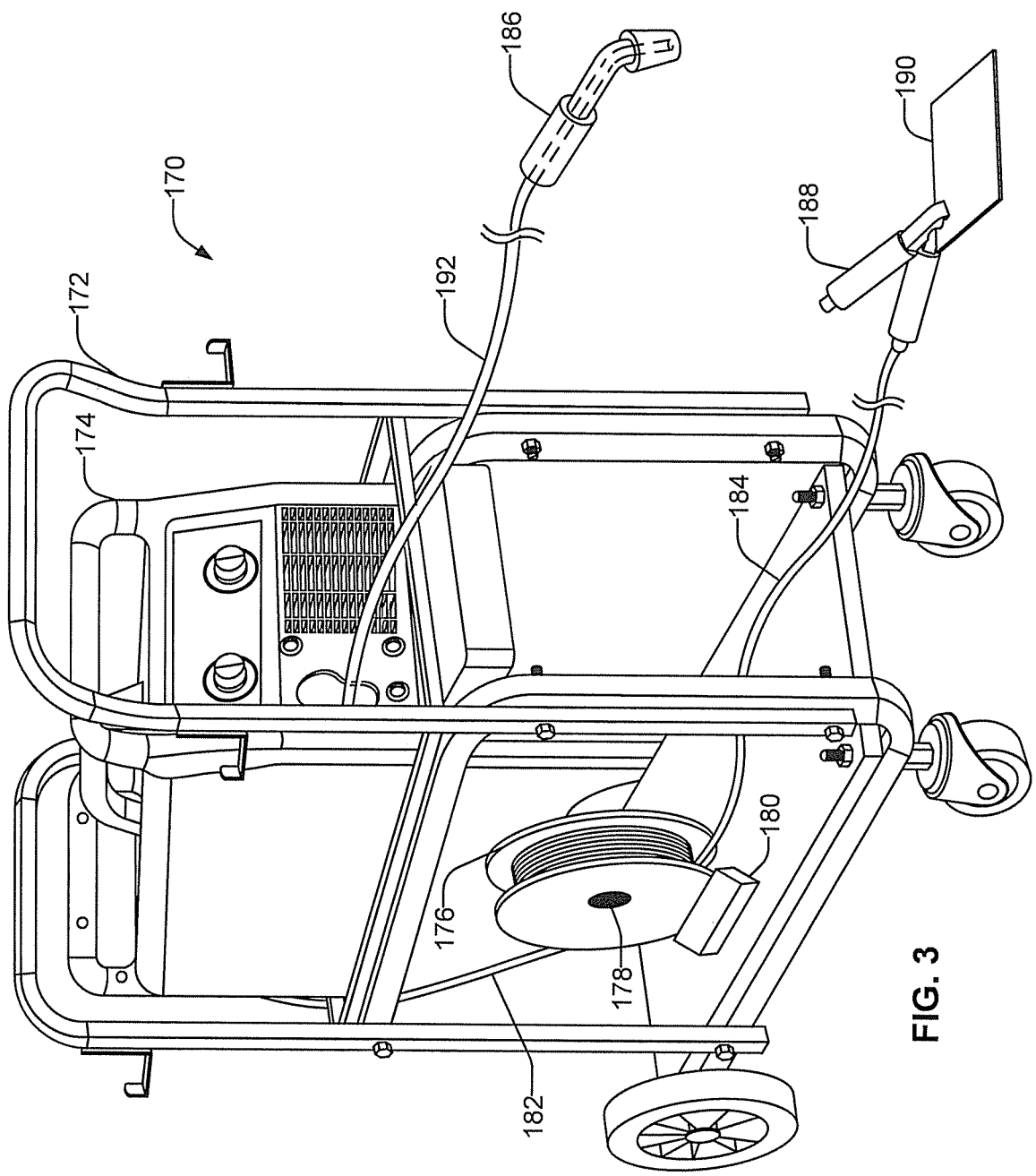
FIG. 3 is another welding-type system with a retractable reel in accordance with aspects of this disclosure.

FIG. 3 illustrates an example welding-type system 170, where a cart 172 supports a welding-type power supply 174 and a retractable cable reel 176. As shown, the reel 176 is secured to the cart 172 by a mount 180 which allows the reel 176 to rotate during winding and unwinding of a work cable 184 connected to a workpiece 190 via work clamp 188. The welding-type power supply 174 provides welding-type power to a welding-type tool 186 via a welding-type cable 192. Welding-power return is provided to the welding-type power supply 174 via the reel 176 from the power supply 174 via a connecting cable 182. The input cable 182 is connected to a retractable module 178, which can include an interface and retraction mechanism, as described with respect to FIG. 1. In examples, the reel 176 includes a cover that serves to protect the cable 186 during winding and unwinding on and off of the reel 176. Within the cover, a cavity houses the wound portion of the cable 186 and the spring or other retracting mechanism.

Additionally or alternatively, the cart 172 can be configured as a wholly enclosed unit. For example, the reel 176 and/or the welding-type power supply 174 can be shielded from external elements by a barrier (not shown), such as a wall casing made of metal or other suitable material. The barrier may have access ports to allow for ambient air flow and/or connections with internal components (e.g., the reel 176, the welding-type power supply 174, etc.).

Figure 4:
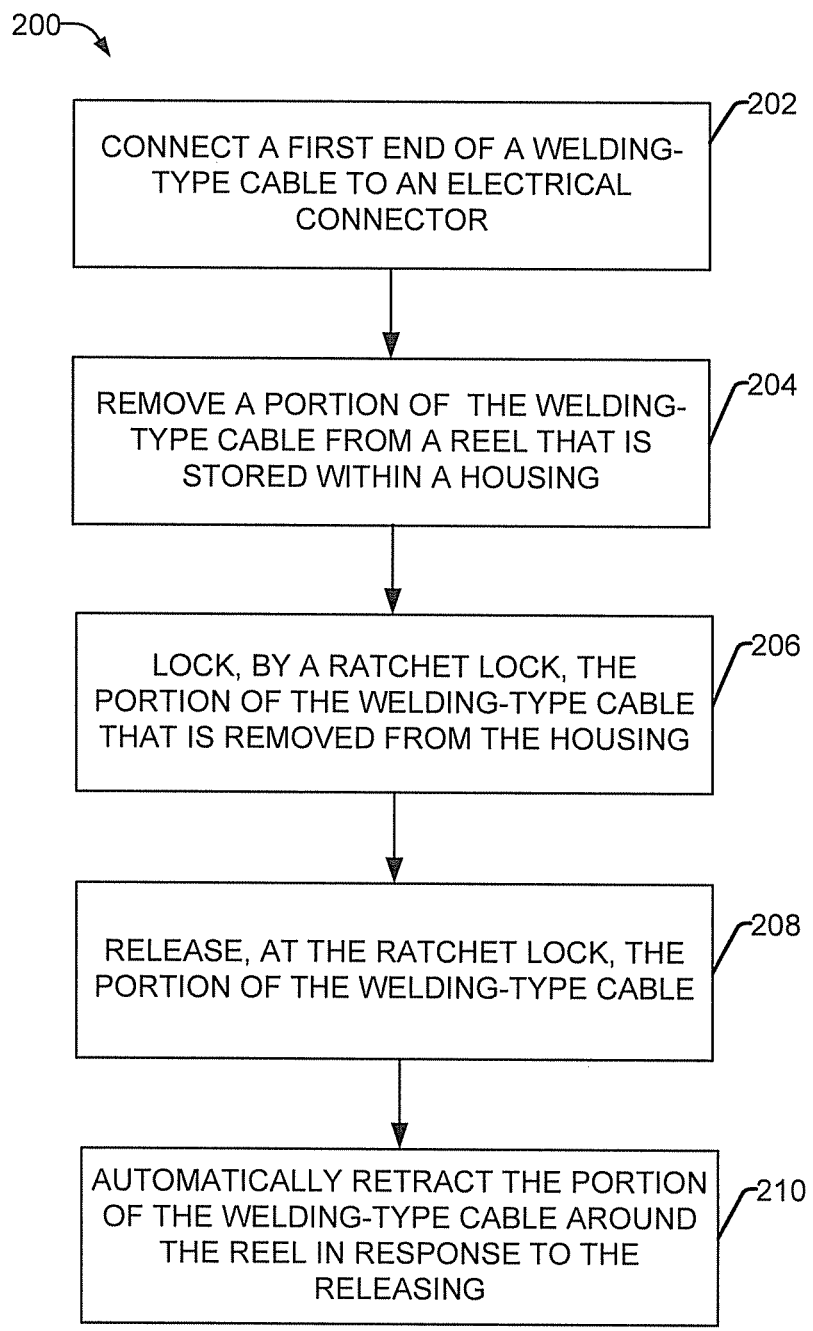
FIG. 4 illustrates an example method of storing a welding-type cable in accordance with aspects of this disclosure.

FIG. 4 is a flowchart illustrating example method 200 of storing a welding-type cable, for example the welding-type cable 108 of FIG. 1. At block 202, a first end of a welding-type cable (e.g., welding-type cable 108) is connected to an electrical connector (e.g., electrical connector 128). At block 204, a portion of the welding-type cable is removed from a reel (e.g., reel 104) that is stored within a housing (e.g., housing 102). For example, the portion of the welding-type cable can include a second end of the welding-type cable configured to connect to a welding-type tool (e.g., welding-type tool 116). At block 206, the portion of the welding-type cable that is removed from the housing is locked by a ratchet lock. At block 208, the portion of the welding-type cable is released at the ratchet lock. At block 210, the portion of the welding-type cable is automatically retracted around the reel in response to the releasing.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system comprising:
    a welding-type power supply configured to provide welding-type power;
    a reel located within a housing of the welding-type power supply;
    a welding-type cable, the reel configured to wind the welding-type cable to reduce a length of the welding-type cable extending from the housing, and to unwind and increase a length of the welding-type cable extending from the housing at least partially wound around the reel when stored, the welding-type cable comprising:
        a first end secured to the reel and electrically connected to the welding-type power supply; and
        a second end configured to provide the welding-type power to at least one welding-type tool, wherein the reel further comprises an electrical connector electrically connecting the first end of the welding-type cable to the welding-type power supply, the electrical connector comprising a first conductor ring connected to the first end of the welding-type cable and a second conductor ring connected to the welding-type power supply, the first conductor ring being concentric with the second conductor ring, and the first conductor ring being electrically connected to the second conductor ring.

2. The system of claim 1, wherein the first and second concentric conductor rings are rotationally aligned such, that during rotation of the reel, electric power is provided to the welding-type cable from the welding-type power supply via the first and second conductor rings.

3. The system of claim 1, wherein each of the first and second conductor rings comprises a layer of conductive material at an interface between the first and second conductor rings.

4. The system of claim 1, wherein the first and second conductor rings are circular in shape, and are positioned within a circular shaped cavity extending into one side of the reel.

5. The system of claim 1, further comprising a spring to provide tension for retracting the welding-type cable by winding the reel when the welding-type cable is at least partially removed from the housing.

6. The system of claim 5, wherein the reel further comprises a locking ratchet to allow the welding-type cable to extend from an opening and prevent automatic retraction of the welding-type cable into the housing.

7. The system of claim 6, the locking ratchet further configured to allow retraction of the welding-type cable into the housing upon release of the locking ratchet.

8. The system of claim 1, wherein the second end of the welding-type cable includes an extension connector configured to prevent the second end of the welding-type cable from retracting into the housing.

9. The system of claim 8, wherein the extension connector is part of a first electrical connector and is configured to both electrically and mechanically connect the welding-type tool to the welding-type cable.

10. The system of claim 1, wherein the welding-type tool is one of a welding-type torch, a plasma cutter, an induction heating cable, or a work clamp.

11. The system of claim 1, wherein the reel is fixed to an interior surface of the housing.

12. A welding-type system comprising:
    a welding-type power supply configured to provide welding-type power;
    a reel located proximate the welding-type power supply;
    a welding-type cable, the reel configured to wind the welding-type cable to reduce a length of the welding-type cable extending from the system, and to unwind to increase a length of the welding-type cable extending from the system at least partially wound around the reel when stored, the welding-type cable comprising:
        a first end secured to the reel and electrically connected to the welding-type power supply; and
        a second end configured to provide the welding-type power to at least one welding-type tool, wherein the reel further comprises an electrical connector electrically connecting the first end of the welding-type cable to the welding-type power supply, the electrical connector comprising a first conductor ring connected to the first end of the welding-type cable and a second conductor ring connected to the welding-type power supply, the first conductor ring being concentric with the second conductor ring, and the first conductor ring being electrically connected to the second conductor ring.

13. The system of claim 12, wherein the reel comprises a cover to protect the welding-type cable during winding and unwinding of the welding-type cable on and off of the reel.

14. The system of claim 13, wherein the reel cover includes a cavity housing the welding-type cable and the spring.

* * * * *